(12) United States Patent
Thompson et al.

(10) Patent No.: US 11,662,994 B1
(45) Date of Patent: *May 30, 2023

(54) SYSTEM AND METHOD FOR UPDATING AN APPLICATION FOR A POPULATION OF COMPUTERS

(71) Applicant: METACTIX LLC, Worthington, OH (US)

(72) Inventors: Phil Thompson, Dublin, OH (US); Michael Theis, Blacklick, OH (US); Justin Kogge, Hilliard, OH (US); David Sethi, Upper Arlington, OH (US); Neil Sethi, Upper Arlington, OH (US)

(73) Assignee: METACTIX LLC, Worthington, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,863

(22) Filed: Aug. 4, 2021

Related U.S. Application Data

(63) Continuation-in-part of application No. 16/949,451, filed on Oct. 29, 2020, now Pat. No. 11,115,269.

(60) Provisional application No. 63/094,087, filed on Oct. 20, 2020.

(51) Int. Cl.
  *G06F 8/65* (2018.01)
  *A63F 13/77* (2014.01)
  *G06F 8/71* (2018.01)

(52) U.S. Cl.
  CPC .............. *G06F 8/65* (2013.01); *A63F 13/77* (2014.09); *G06F 8/71* (2013.01)

(58) Field of Classification Search
  CPC .............. G06F 8/65; G06F 8/71; A63F 13/77
  See application file for complete search history.

(56) References Cited

U.S. PATENT DOCUMENTS

| | | | |
|---|---|---|---|
| 9,032,388 B1 | 5/2015 | Watson et al. | |
| 9,176,752 B1* | 11/2015 | Marr | G06F 9/44505 |
| 9,935,772 B1* | 4/2018 | Madisetti | G06F 21/6209 |
| 10,845,787 B1* | 11/2020 | Malaspina | G06F 9/4401 |
| 2009/0252325 A1* | 10/2009 | Reus | H04L 9/0891 |
| | | | 380/255 |
| 2011/0126185 A1* | 5/2011 | Waris | H04L 67/1044 |
| | | | 717/169 |
| 2011/0250971 A1* | 10/2011 | van Os | A63F 13/795 |
| | | | 463/43 |
| 2013/0212573 A1* | 8/2013 | Archer | G06F 8/656 |
| | | | 717/171 |
| 2014/0040979 A1* | 2/2014 | Barton | H04W 12/30 |
| | | | 726/1 |
| 2014/0227976 A1* | 8/2014 | Callaghan | H04L 12/1859 |
| | | | 455/41.2 |
| 2014/0237465 A1 | 8/2014 | Lin | |

(Continued)

*Primary Examiner* — Blake J Rubin
(74) *Attorney, Agent, or Firm* — Vorys, Sater, Seymour and Pease LLP; Rex W. Miller, II

(57) ABSTRACT

A system and method for managing a population of devices and in particular, software updates and version control of applications across the population includes permitting a first device to receive an update from a publisher and generating an update manifest that is propagated to other devices in the population. Applications within a population of devices are selectively disabled and enabled to prevent multiple update versions of the same application across the population.

22 Claims, 5 Drawing Sheets

(56) References Cited

U.S. PATENT DOCUMENTS

| | | | |
|---|---|---|---|
| 2014/0282480 A1* | 9/2014 | Matthew | G06F 8/60 717/172 |
| 2015/0007255 A1* | 1/2015 | Kim | H04W 4/50 726/1 |
| 2015/0249684 A1* | 9/2015 | Zhang | G06Q 10/10 726/1 |
| 2015/0356116 A1* | 12/2015 | Lin | G06F 16/184 707/613 |
| 2015/0370827 A1* | 12/2015 | Parkison | G06F 16/178 707/610 |
| 2016/0004528 A1* | 1/2016 | Price | G06F 8/65 717/173 |
| 2016/0191613 A1* | 6/2016 | Srinivasan | H04L 69/00 709/201 |
| 2017/0187578 A1* | 6/2017 | Zhu | H04L 41/0889 |
| 2017/0272317 A1* | 9/2017 | Singla | H04L 41/12 |
| 2020/0177444 A1* | 6/2020 | Nelson-Gal | H04L 67/56 |
| 2021/0216353 A1* | 7/2021 | Gao | H04L 65/40 |

* cited by examiner

SYSTEM AND METHOD FOR UPDATING AN APPLICATION FOR A POPULATION OF COMPUTERS

CROSS-REFERENCE TO RELATED APPLICATIONS

This application claims priority benefit of U.S. patent application Ser. No. 16/949,451 filed Oct. 29, 2020, and U.S. Provisional Application Ser. No. 63/094,087 filed Oct. 20, 2020, the complete disclosures of which, in their entirety are herein incorporated by reference.

BACKGROUND OF THE INVENTION

The present disclosure relates to systems and methods for installing and updating games and applications on a population set of user devices. It finds particular application with physical centers that employ a set of devices for use by a set of users. Exemplary embodiments of the present disclosure describe gaming centers that employ a set of computers and host computer game competitions. However, it is to be appreciated that the present exemplary embodiments are also amenable to other like applications.

Generally, there is a limited amount of storage space on computing devices such that a particular device is not capable of storing every possible game and application that a user may wish to execute. This is particularly relevant in the gaming center industry which house a number of computing devices used by users for competitive and non-competitive gaming. Since games utilize significant resources of a computing device (storage and computational) the number of games stored on a device are limited to those that will fit on the limited hard drive space. A game center may need to manually reconfigure devices between competitions by uninstalling and installing particular games; however, this process can be time and labor intensive and prevent rapid transitions between competitions as well as impact day to day operations of a gaming center. Alternatively, a game center may have sets of devices dedicated to particular games, for example a game center with 20 devices may have 10 devices that store and run games A, B, and C while the other 10 devices store and run games C, D, and E. However, this ultimately limits the number of devices available to hold gaming competitions with certain games.

In addition, games and applications are often the subject of software updates from a publisher. During the launch of an application, the application or a launcher thereof, often communicates with the publisher to check for and obtain if present, an update. Because updates can be pushed at different times, it is possible that a gaming center may have different devices running different versions of an application. In some cases, different versions (updated and non-updated applications) may not be compatible for use together thus requiring an update, or may have competitive advantages in playing the games that are undesired in an equitable competition environment. Thus, in order to ensure a fair playing field it is desirable that each game and application on one device, is exactly the same version as the same game and application on other devices.

Therefore what is needed are systems and methods that allow for a gaming center to optimize its device resources and create a fair playing field by controlling the versions of software implemented across a population of user devices.

SUMMARY OF THE INVENTION

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

Presently disclosed are systems and methods for updating an application for a population of devices using a controller. In one embodiment, a method includes receiving, at the controller, a first notice that an update is pending for an application from a first device of a population of devices; instructing each device of the population of devices to disable the application; permitting the update for the application to proceed on the first device; receiving, at the controller, a second notice that the update is complete for the application from the first device; after receiving the second notice, publishing the update for exchange with the other devices of the population of devices, such that the other devices of the population acquire the update; and sending an instruction to re-enable the application for each device of the population of devices after receiving notification that the update is complete for said device.

In some embodiments, the population of devices is a subset of devices associated with a game center. In some embodiments, each of the devices of the population has a profile accessible by the controller, wherein the profile includes an identification of applications used by the device. In some embodiments, the population of devices includes those devices for which the profile associated with the device includes an identification of the application for which the update is pending.

In some embodiments, the step of instructing each device of the population of devices to disable the application further includes sending an instruction to each device that causes each device to disable the application from operating on the device. In some embodiments, the step of permitting the update for the application to proceed on the first device further includes instructing the first device to communicate with a publisher of the application to receive the update from the publisher. In some embodiments, upon receipt of the update from the publisher, the first device installs the update for the application. In some embodiments, the method also includes after permitting the update for the application to proceed on the first device, updating the profile of the first device to reflect the update of the application.

In some embodiments, the controller and the devices are in separate locations. In some embodiments, the devices exchange the update via a peer-to-peer exchange. In some embodiments, the method also includes, for each of the other devices, in response to receiving, a notice that the update is complete for the application, instructing such device to publish the update for the peer-to-peer exchange with the other devices. In some embodiments, the update is communicated to the controller and the controller publishes the update such that the update is available to other devices.

In some embodiments, the method also includes after receiving the notice that the update is complete for the application from such device, updating a profile of such device to reflect the update of the application. In some embodiments, the step of publishing the update further includes instructing the first device to publish an update manifest generated by the first device based on the results of the update applied to the application, wherein the update manifest comprises files and instructions for modifying the application to conform with the update. In some embodiments, the update manifest is created by a comparison of a directory listing of the application prior to the update with the directory listing of the application after the update.

In some embodiments, wherein the first notice is received by the controller following an update required notification received by the application in response to a user attempting to invoke the application on the first device. In some embodiments, the method also includes sending an instruction to the first device to cause the application to request an update from the publisher when the first device is in an idle state. In some embodiments, the method also includes the first notice is received by the controller after the first device contacted the publisher to update an application during an idle state of the first device.

Also disclosed is a system for updating an application for a population of devices, the system comprising at least one memory to store instructions; at least one processor, communicatively coupled to the at least one memory, that executes or facilitates execution of the instructions, the instructions comprising the methods as described herein.

Also disclosed herein is a method of updating an application for a population of devices using a controller and a client installed on each device in the population of devices. The method includes the client sending a first notice to a controller, the first notice that an update is pending for an application from a first device of a population of devices. The method further includes each client disabling the application on the associated device and permitting the update for the application to proceed on the first device. The method also includes publishing the update for exchange with the other devices of the population of devices, such that the other devices of the population acquire the update, and each client re-enabling the application for each device of the population of devices after receiving a notification that the update is complete for said device.

BRIEF DESCRIPTION OF THE FIGURES

The invention may be best understood from the following detailed description of example embodiments of the invention taken in conjunction with the accompanying drawings. The subject disclosure may take form in various components and arrangements of components, and in various steps and arrangement of steps. The drawings are only for purposes of illustrating the preferred embodiments and are not to be construed as limiting the subject disclosure.

DETAILED DESCRIPTION

Embodiments of the subject matter presently disclosed relate to systems and methods for updating an application for a population of user devices using a controller. The disclosed subject matter further relates to a system for automatically enforcing version control for electronic applications, e.g., software applications. For purposes of illustration, the presently disclosed subject matter is described in connection with the electronic gaming industry, and more particularly, in connection with the management of devices in an electronic gaming center; however the disclosed subject matter may also be used for updating applications for a population of devices in contexts outside of the gaming industry. For example and without limitation, a set of devices may be in an office space and the users may use the devices for work related purposes (rather than for gaming). In these situations, it may be desirable to control the versions and updates to various productivity software, for example, when certain applications must be updated for security reasons.

Referring generally to FIGS. 1-5, embodiments of systems and methods for updating an application for a population for user devices using a controller are disclosed that enforce desired version control requirements while reducing burdens on the local internet connection.

Figure 1:
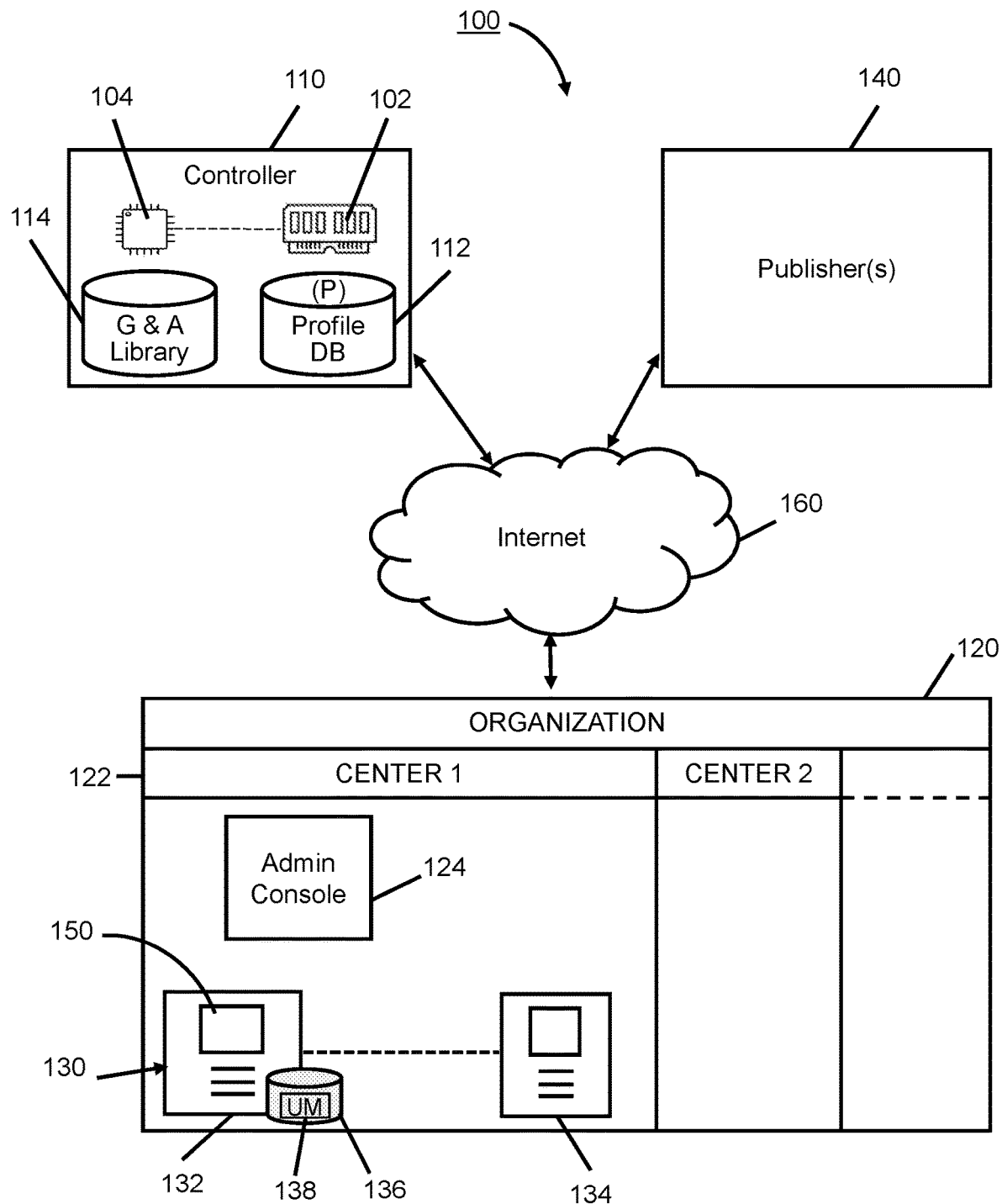
FIG. 1 is an embodiment of a system according to the present disclosure.

Referring now to FIG. 1, an embodiment of a system for updating an application for a population of user devices using a controller is illustrated. The system 100 includes a controller 110 configured to implement the application update methods described in greater detail below. The controller 110 may be variously embodied without departing from the scope of the present disclosure. The controller 110 may include a storage medium/memory and a processor (not illustrated). The processor is configured to control the operations and components of the controller 110 and may execute applications and instructions stored in the memory. The controller 110 may also include at least one user interface and/or display configured to present data related to the operation of the update system to a user. The user interface may also allow a user interact with the controller 110 for monitoring and controlling the various components and actions described herein.

The controller 110 may also include or have access to various data storage components, such as a profile database 112 and a games and applications database 114 as described further below. While two databases are illustrated, it is to be appreciated that the data storage components may be combined into a single component or divided among multiple components as appropriate for a particular implementation. Data storage may be implemented on physical devices such as flash and hard disk drives, data storage may also be implemented on remote servers i.e., cloud storage.

The controller 110 communicates with various user devices 130. In one embodiment, the controller 110 communicates with the devices 130 via the internet 160 or a wide area network (WAN), and the devices 130 are remote from the controller 110. In another embodiment, the controller 110 may be located on a server within a center 122 and communicate with a population of devices 130 via a local network area network (LAN). In yet another embodiment, the controller 110 may be implemented on one of the devices of the population.

Each user device 130 is configured to run an application, for example and without limitation, game software and productivity software. An application is published by a publisher 140. The devices 130 may communicate with publishers 140 via the internet to download, install, or update applications. For purpose of this disclosure, Games and/or applications may generally be referred to herein as "G&As."

The controller 110 may be used to administer devices 130 of an organization 120. In one example, the organization 120 may be an electronic gaming organization which provides infrastructure for competitive electronic gaming. An organization 120 may include one or more game centers 122. Each game center 122 contains a plurality of devices 130 that may be used to access electronic games or other applications. For example, the devices 130 may be computers. In some embodiments, the devices 130 may include dedicated game consoles or other components suitable for hosting games and/or other applications suitable for use in connection with the present disclosure. In yet other embodiments, the devices 130 include any computing devices capable of executing programs embodying the methods disclosed herein, for example and without limitation, devices may include smartphones and/or virtual reality systems. Each device 130 contains a client 150 configured to communicate with the controller 110. As used herein, the term "client" generally refers to a software application installed on the device 130 which can be provided with permissions to control various functions and operations of the associated device 130. In some examples, the electronic games are real-time, multiplayer games in which users of devices compete. Each device 130 may also include a data storage 136, for example and without limitation, a hard drive configured to store software for running G&As as well as update manifests 138 (described in greater detail below). The update manifest 138 may be sharable to the other devices 134 of a population of devices 130, for updating a particular G&A without a need for the other device 134 to communicate directly with the publisher 140.

The controller 110 may support one or more organizations 120. Within each organization 120, the devices 130 may be uniquely identified. For example, each device 130 may have a unique identifier, generally referred to as a "Device ID". Each game center 122 center may have a unique identifier, generally referred to as a "Center ID". Each organization 120 may have a unique identifier, generally referred to as an "Organization ID". Each device 130 may therefore have a Device ID and be associated with a Center ID and Organization ID to facilitate administration of devices within a given game center or organization.

Users may be located within a single game center 122, or may be located among multiple game centers 122 of an organization. Each game center 122 may be a physical location, such as a retail center that users visit to compete in electronic game competitions. In another example, one physical location may contain multiple game centers, each of which contains a set of devices 130. Devices 130 may be reassigned between game centers 122 based upon the requirements of the organization.

In some embodiments, the controller 110 includes a profile database 112. Each device 130 may be configured with a set of applications, which may include games suitable for an intended use. The collection of applications, which may include games, are defined by a profile. Profiles for devices are defined by the center 122. For example, a center 122 may intend to conduct competitions for three electronic games. Accordingly, at some point in time the center 122 would configure a population of devices 130 with a profile including the corresponding G&As necessary for those activities.

In one embodiment, the system 100 includes at least one administrator console 124. The administrator console 124 communicates with the controller 110 and enables an administrator to perform certain administration and configuration actions. For example, the administrator console 124 may be used by the administrator of an organization 120 or an administrator of a specific center 122 to define a profile, which is stored in the profile database 112 of the controller 110. While the administrator console 124 is illustrated in FIG. 1 as being located within a center 122, the location of the administrator console 124 is not limiting and the administrator console 124 may be located off-premises and in communication with the controller 110. Once a profile is created, the administrator, using the administer console 124, may instruct the controller 110 to assign the profile to one or more devices 130. In some embodiments, an administrator may assign the same profile to all the devices 130 in a center 122. Alternatively, a profile may be assigned to only a subset of devices 130, or to a single device as desired. The association of a profile (P) with each device 130 is stored by the controller 110 in the profile database 112. In some embodiments, the profile is not stored on the device. In this manner, the controller 110 maintains a record of which G&As should be present on each device 130 regardless of the actual content on the device at any given time.

Because G&As are periodically updated by the publisher, it may be desired to ensure that the devices 130 are using the same version of a particular application. For example, in a gaming competition it is desirable that each device 130 is running the same version of the game application eliminating potential competitive advantages that one version (e.g. an updated versions) may have over another (e.g. a non-updated version). In some embodiments, the profile (P) stored in the profile database 112 may also contain an indication of the version of each G&A required by the profile. By maintaining both the configuration of required G&As, and the required version of each G&A, the controller 110 is able to maintain the precise configuration for devices to which that profile is assigned.

In addition to the profile required for each device, the controller 110 may also store in the profile database 112 a record of the actual configuration of a device 130. When G&As are installed, removed or updated, the device 130 undergoing the change may communicate with the controller 110 to indicate the change in the device configuration. The controller 110 stores the updated configuration in the profile database record for the device. If the record for a particular device does not match the profile required for the device, the controller 110 may determine that the device is out of compliance and take appropriate action, such as sending an instruction to disable the device 130 until it complies with the profile. That is, after receiving the disabling instruction, the client 150 may then "disable" the application by refusing to launch the application. In some embodiments, the controller 110 may send instructions to the devices indirectly by storing the instructions in the profile database 112, such that the instruction can be read by the client 150 of the device. In other embodiments, the controller 110 may send instructions directly to the device.

In some embodiments, the controller 110 also includes an applications database 114. The applications database 114 may contain relevant metadata for the G&As that the system 100 is configured to manage. For example, the applications database 114 may include information for each G&A such as the G&A publisher, most recent released version, version update schedule, or any other useful information. In some embodiments, the applications database 114 may be referred to as a Games and Application Library (G&A Library).

In various embodiments, the system 100 facilitates updating a G&A for a population of devices using the controller. As described above, the devices 130 may be grouped within a center 122, and may each also have an assigned profile. The controller 110 may identify a population of those devices 130 having a profile that requires a particular application. As an example, a game center 122 may have three profiles each of which is assigned to certain devices. Two of the three profiles may require the game "A", whereas the third profile does not require game "A". Based on the profiles, the controller 110 may selectively define the relevant population as being those devices associated with the two profiles that require the game "A" to be installed. In this manner, the controller 110 may administer various populations of devices based upon with overlapping G&A requirements.

Figure 2:
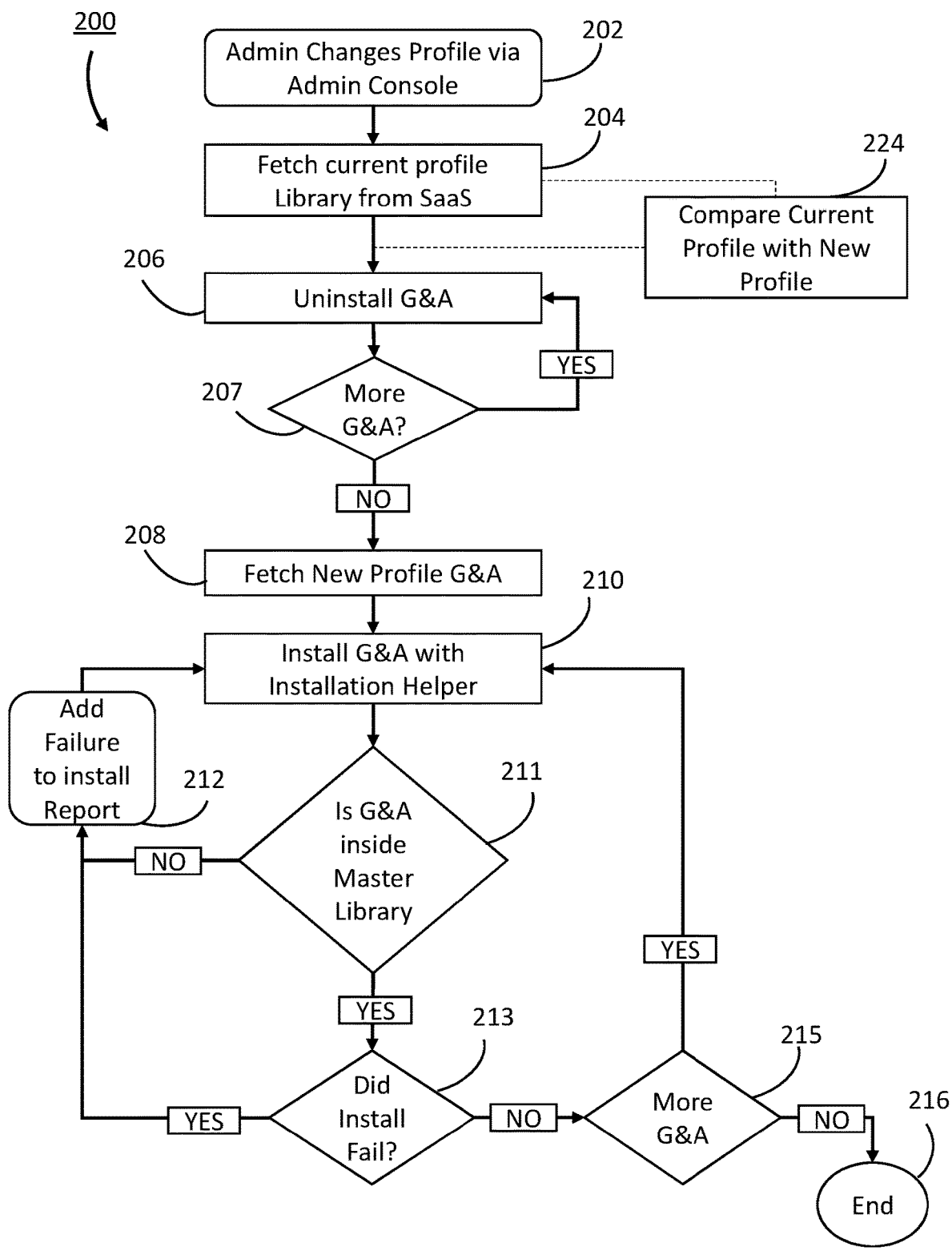
FIG. 2 is a flow chart of a method for installing games and applications to bring devices into compliance with a selected profile in accordance with the present disclosure.

Referring now to FIG. 2, a process for configuring a given device 130 based on its profile is illustrated. In various embodiments, the process may include creating a profile, purging G&As on a device and installing G&As to bring the device into compliance with a selected profile. As mentioned above, there is a limited storage space on devices 130 such that a device is not capable of storing and executing every possible G&A that an organization 120 may have in its library. In some instances, it may be desirable for a device 130 to have a minimum number of G&As installed so that those particular games and applications run at an optimal performance on the device 130. FIG. 2 illustrates a process 200 that results in G&As being installed according to a particular profile. The process is representative of a set of instructions that may be executed by one or more of an administrator console 124, a user device 130, or controller 110 in communication with a client 150 on a user device 130. The exemplary flow chart represents the installation process 200 for a device 130 pre-loaded with G&As of a current profile, thus the flow chart illustrates both the removal of current G&As and installation of new G&As associated with a new profile. However, it is to be understood that the process described in the flow chart of FIG. 2 is amenable to installing new G&As associated with a new profile on a device 130 existing without pre-loaded games and applications.

An administrator operating an administrator console 124, in communication with a group of devices 130, may begin the process 200 for changing the G&As on a particular device by selecting a device 130 or group of devices for a new profile. In some embodiments, an administrator creates a profile (P) which, as briefly described above, includes a listing of G&As selected from the games and applications database 114. The profile may also include a listing of support files that may be needed by at least one of the G&As selected for the profile in order for a G&A to properly and optimally execute. Profiles created by the administrator (or others) are stored in the profile database 112. The process 200 begins at step 202, wherein an administrator navigates options on the administrator console 124 to create or change the profile for at least one device 130. For example and without limitation, an administrator is able to search for and select a new profile located in the profile database 112 to be prorogated to at least one device 130.

At step 204, the process 200 includes fetching the current profile, if any, assigned to the device 130. For example and without limitation, a record of the actual configuration of the device 130 may be stored within the profile database 112 and associated with identifiers, e.g., a unique Device ID, and in some embodiments, a Center ID and Organization ID. Using these identifiers, a stored profile representing the current configuration of a device 130 may be queried and identified. The current configuration of the device 130 is retrieved including at minimum, a listing of the G&As which are currently installed on the device 130. It is to be approached that while this process is being described with respect to one device 130, the process may be applied to multiple devices 130 in a population simultaneously.

At step 206, G&As currently installed on the device 130, as provided within the retrieved current profile, are uninstalled from the device 130. Generally, each G&A is uninstalled from the device in turn. That is, a first G&A is uninstalled at step 206 and, if at step 207 another G&A is detected on either the current profile or device, the detected G&A is uninstalled, back at step 206, until a determination is made that there are no more G&As on the current profile or device. In some embodiments, the process 200 includes uninstalling all G&As listed in a current profile on a device, after which, the device is scanned for additional G&As installed to the device but were not listed on the current profile. If additional G&As are found at step 207, then the uninstall process at step 206 continues until there are no more G&As on the device. Uninstallation of current G&As may be accomplished by a helper, i.e. a software program for uninstalling, executed by the device or system in communication with the device e.g., the administrator console 124.

In some embodiments, the current G&As of the device 130 are uninstalled simultaneously. In some embodiments, each and every current G&A on the device is removed whether or not a current G&A is listed on the new profile. In yet still other embodiments, the uninstallation process includes a complete wipe of a memory of the device. In yet other embodiments, the installation process 200 includes, at step 224, a comparison of the current profile with the new profile. If there are G&As common to both profiles, only those current G&As not on the new profile will be uninstalled from the device.

Once there is a determination that there are no more G&As to be uninstalled (NO) at step 207, then at step 208, the new profile selected by the administrator for installation on the device 130, is fetched from the profile database 112. As described above, the new profile is retrieved from the profile database 112. At step 210, the G&As associated with the new profile are installed to the device. In some embodiments, installation of G&As onto the device is facilitated by an installation helper, i.e., a software program for installing games and applications.

The process 200 includes, at step 211, determining whether a G&A of the new profile is within the master library of G&As within the games and applications database 114. If the G&A requested for installation, per the new profile, is not within the master library of the games and applications database 114 (NO), a failure to install report is generated at step 212. That is, a message is transmitted to the administrator console 124 and/or the controller 110 that a requested G&A was not installed to the device 130. Here, the administrator console 124 and/or the controller 110, can modify the new profile to remove the G&A that failed to install from the profile. In this way, the listing of the G&As of the new profile and those G&As actually installed to the device will be in agreement.

After the failure to install report is generated and transmitted, the next G&A in the new profile is queued for installation. If, at step 211, the queued G&A of the new profile is within the Master Library (YES), the software for the G&A is downloaded to the device. In some embodiments, the G&A is downloaded from the publisher 140 via the internet 160. In other embodiments the G&A is downloaded from the controller 110. In yet still other embodiments, the G&A is downloaded from another device 134 within the center 122.

When a queued G&A is found to be in the master library and installed, at step 213 there is a check to see if the installation of the queued G&A was successful. If, at step 213, it is found that the installation failed (YES), e.g., there was a communication error between the device and the source of the application software, then a failure to install report is generated at step 212. That is, a message is transmitted to the administrator console 124 and/or the controller 110 that a listed G&A was not installed to the device. Here, the administrator console 124 and/or the controller 110, can modify the new profile such that the G&A that failed to install is no longer listed in the new profile. In this way, the listing of the G&As of the new profile and those G&As actually installed to the device will be in agreement.

If the installation of the queued G&A is successful, i.e. installation of the G&A has not failed (NO), at step 215 there is a check for other G&As within the new profile that are yet to be installed. If, at step 215, it is determined that at least one more G&A needs to be installed (YES), the next G&A is installed at step 210. As can be appreciated, this installation 210, library check 211, and failure check 213 loop repeats for each G&A listed within the new profile. When there is a determination that no more G&As remain on the new profile for installation (NO), i.e. all G&As on the new profile have been installed or are associated with a failure to install report, then the installation process ends at 216.

Figure 3:
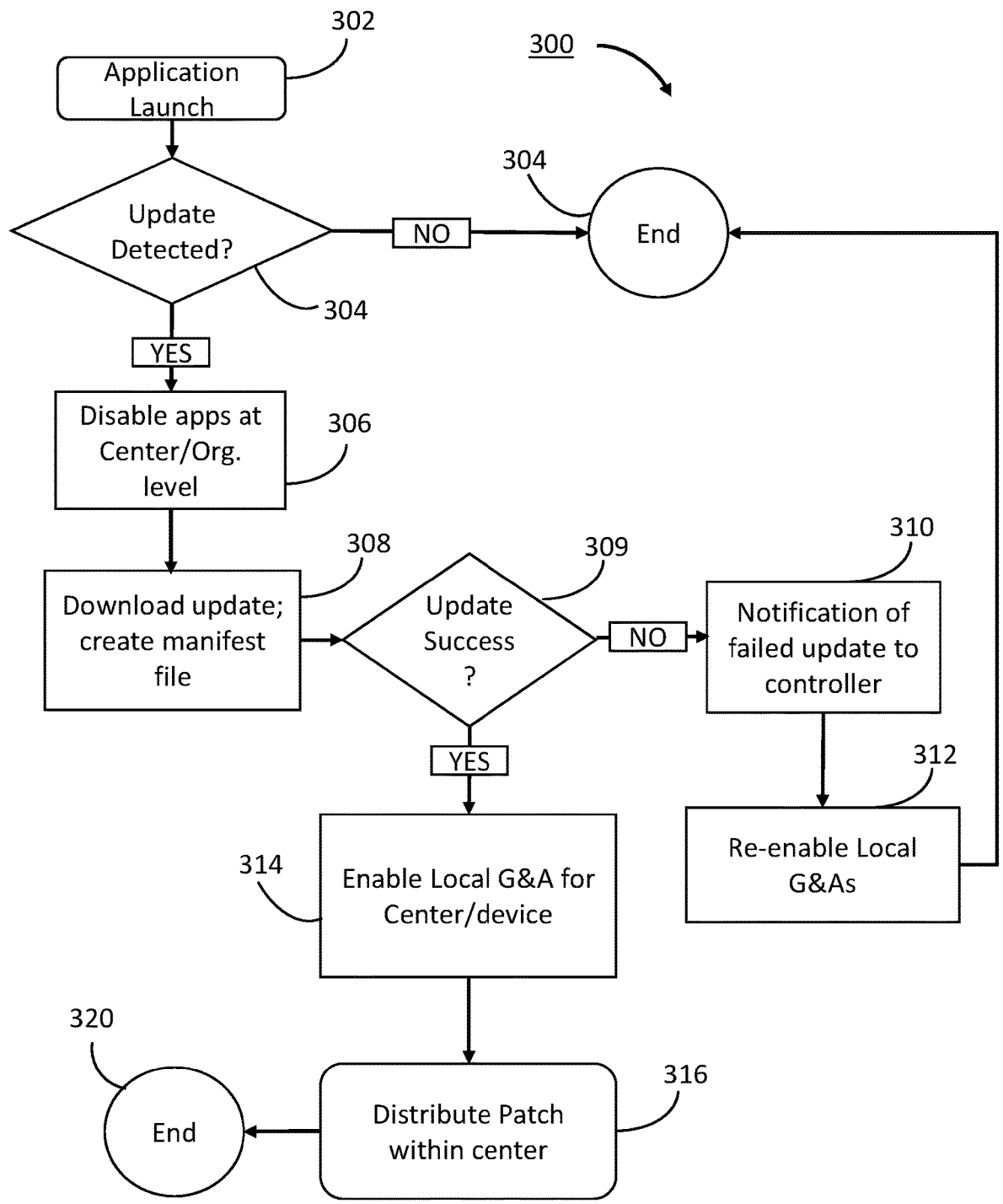
FIG. 3 is a flow chart of a method for updating a game and application based on a user invoking an application in accordance with the present disclosure.

Referring now to FIG. 3 a process 300 of triggering updates to a G&A is illustrated. The process 300 is initiated by a user invoking an application and the client 150 catching the publisher's update requirement. The process 300 starts at step 302 with a user of a first device 132 launching a G&A. As used herein, the "first device" refers to the device upon an update to a game or application is determined to be required. Accordingly, any device 130 of the population may be considered the "first device" with respect to a particular update of a particular G&A.

In some embodiments, before starting the actual G&A, launching software handles updates and patching of the G&A. For example, the launcher may check for updates, replace the appropriate libraries, run an integrity check, and then start the G&A. The client 150 may include a launcher component that launches (e.g. starts) a G&A and may control the process for when and how a G&A is permitted to launch. As briefly described above, the controller may send an instruction to disable to G&A to the client, and as a result, which the launch component of the client 150 will prevent use of the G&A. In this way, the client will not launch a G&A that is not in compliance with an updated profile and the like. At step 304, the client 150 is configured to detect if a G&A is being updated. In one embodiment, the client 150 is configured to listen to the invoked G&A and/or associated launcher component which may be embodied as launching software. If there is no update detected (NO) then the client ends the process at step 320, and the G&A is started and used by the user on the first device 132.

If at step 304, an updated is detected (YES) on the first device 132, e.g., the client 150 catches that the launching software of the G&A has determined an update is required, then at step 306, the client 150 transmits to the controller 110 an update message indicating that it has detected an update on the first device 132. Upon receiving the update message from the client 150 of the first device 132, the controller 110 sends a disable message to all devices 130 of the population that have the G&A for which the update is required within that device's profile. This includes sending a disabling message to each client 150 and associated launcher component. The disable message causes each of the devices 130 to disable all instances of the update pending G&A. In some embodiments, this includes disabling all instances of an update pending G&A at the organization 120 and/or center 122 level. In this way, the controller 110 is able to prevent differing versions of the same G&A, e.g., one updated version and one non-updated version, from being used by users in the same center 122 or organization 120. Furthermore, this prevents multiple devices 130 of a population from simultaneously downloading an update for the same G&A thereby conserving communication bandwidth to/from the applicable center 122.

After the update pending G&A has been disabled within the population of devices 130, the first device 132 downloads and installs the update at block 308. In some embodiments, the update is downloaded directly from the publisher 140 via the internet 160. In other embodiments, the update is downloaded from a source other than the publisher 140 via the internet, including but not limited to an update database located with the controller 110, administrator console 124, or cloud network. During or after installation of the update, the client 150 of the first device 132 creates an update manifest 138 that can be used to propagate the update to other devices 134 of the population. In one embodiment, the update manifest defines a change log including instructions on how the remaining devices 130 are to update the G&A. For example, the update manifest 138 may include a list of files to acquire from the first device as well as a list of instructions for installing the update. The instructions for installing the update may include adding, removing, or modifying particular files, components, registry entries, or other features of the update pending G&A. In some embodiments, an update manifest 138 is created by comparing a directory listing of the G&A software before and after the update and ascertaining the differences between the two. The differences are then complied in the update manifest 138 with instructions for how to update the application for the other devices.

At step 309, a success confirmation of the update on the application is performed. If the update failed (NO), e.g., the download connection between the publisher and first device 132 was interpreted, a notification of the failed update is sent to the controller 110, at step 310. Upon receiving the notification from the first device 132, the controller 110, at step 312, re-enables the update pending G&A on the population of devices 130. This action ends 304 the update process and allows use of the non-updated G&A across the population of devices 130.

If, at block 309, the update was successful (YES), then the G&A is re-enabled for each device 130 in the population of devices at the center or organization level. For example, the first device 132 notifies the controller 110 that it has completed the update. In some embodiments, upon receiving the notification, the controller sends to the first device 132, a message to enable the application. In other embodiments, the first device 132 automatically enables the application upon completion of the update. It is to be appreciated that that the enabling of the application is not required at this point. That is, in yet still other embodiments, the updated application on the first device 132 may be enabled at a later time, e.g., after the application on other devices of the population of devices 130 are updated.

After the completion of the update of the application, the first device 132 then sends a message to the controller 110 indicating that the update manifest, prepared during step 308, is ready to be exchanged with the population of devices 130. The controller responds by sending a message to the population of devices, indicating that an update is ready, including instruction on where to get the update manifest. In response to the message from the controller, the other devices that require the update then acquire the update manifest. The update manifest created at step 308 is thus distributed at step 316 to the other devices 130. The update manifest and associated files or other content may be distributed through one or more methods. The distribution of the update manifest 138 is described in greater detail below with respect to FIG. 5. In one embodiment however, the update manifest is shared by the first device 132 to the other devices 134 through a peer-to-peer exchange. In some embodiments, upon receiving the update manifest, each of the other devices 134 makes the update manifest available through peer-to-peer exchange such the burden of sharing the update manifest is shared among multiple devices of the population. In some embodiments, the controller 110 acquires the update manifest and distributes it to each of the other devices 134.

With the update manifest distributed to each of the devices 130 with the G&A listed in the profile, each device uses the update manifest to update the applicable G&A. In one embodiment, the population of devices 130 execute instructions defined in the update manifest 138 to update the G&A locally on each device. In this manner, the other devices 134 are not required to individually download the update from the publisher 140 thereby conserving communication bandwidth for the center 122.

Upon completion of local updates using the update manifest, each device 130 of the population sends a message to the controller 110 that the G&A has been updated successfully on the device. The controller 110 records the application update activity for each device 130 and enables the updated G&A, allowing it to be used on the device. In some embodiments, each device 130 remains disabled until each device 130 is updated. The disabling and enabling may be controlled by a launcher component of the client 150, as discussed above.

Figure 4:
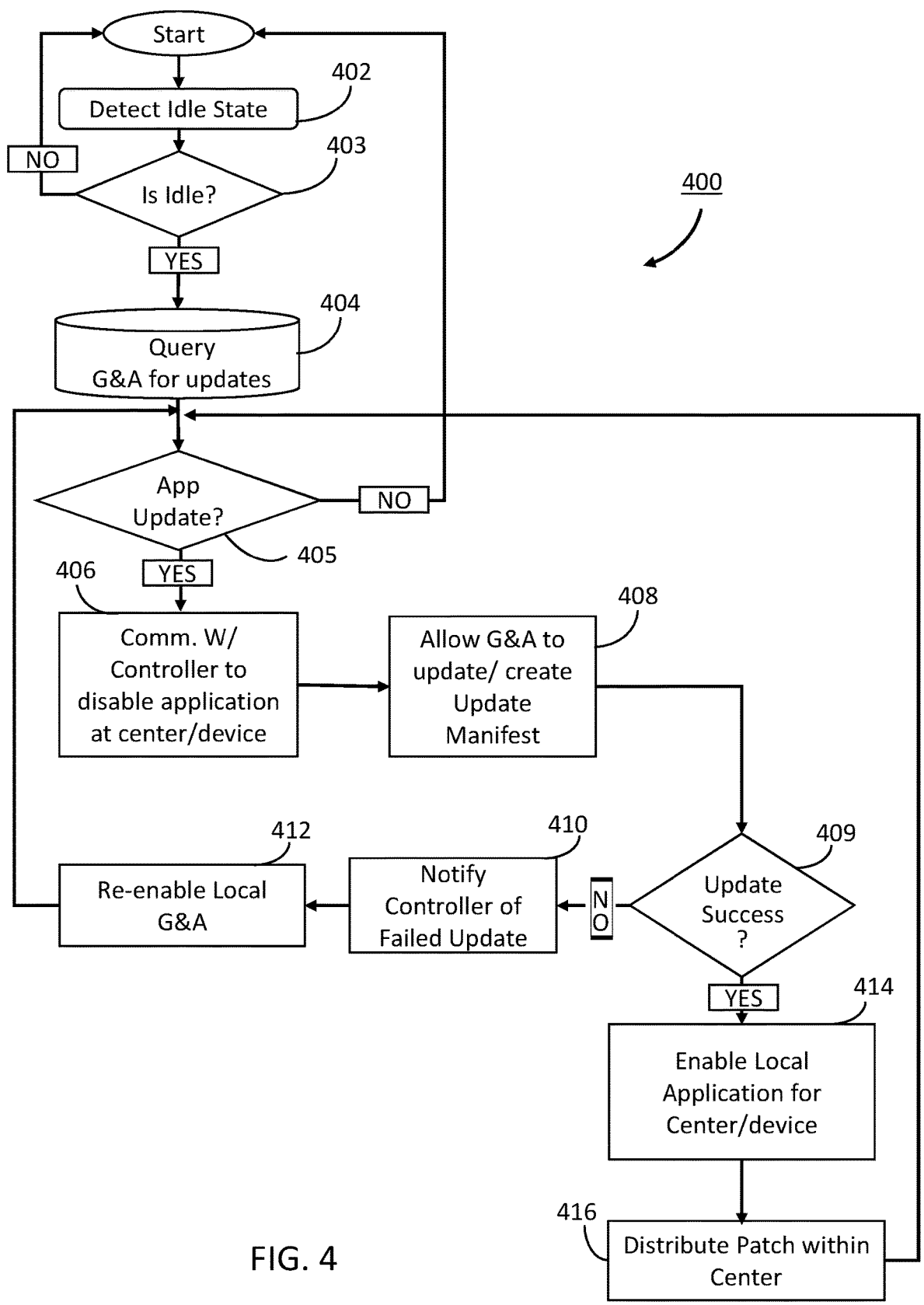
FIG. 4 is a flow chart of a method for updating a game and application during a determined idle state of the device in accordance with the present disclosure.

Referring now to FIG. 4, another process 400 of triggering updates of a G&A is illustrated. The process 400 may be employed when a device is in an idle state thereby making productive use of the device when the device is not in use by a user. The process 400 may be initiated by the client 150 or the controller 110. The process 400 starts at step 402 with the detection of an idle state. The client 150 may monitor the state of the first device 132 and report when idle. In other embodiments, the controller 110 may periodically query a device to determine whether the device is idle. The process at step 403 determines whether a particular device, such as a first device 132, is in an idle state, e.g., it is not being used by a user at the center 122. If there is a determination that that the first device 132 is not in an idle state (NO), then the process 400 loops back to the start until there is a determination that the first device is in an idle state. In some embodiments, this loop to check the idle status of a first device 132, may be performed continuously, e.g., the client 150 may continuously monitor the status of the first device 132. In other embodiments, the loop to check the idle status of a first device 132 is performed periodically, e.g., the client 150 or controller 110 queries the status of the first device 132 according to a specified period or schedule, which may be established by the administrator.

If at step 403 the first device 132 is determined to be in an idle state (YES), the process 400 moves to step 404. At step 404, the system detects if a G&A requires an update. In one embodiment, the client 150 cycles through each G&A of the profile associated with the first device and/or each G&A installed on the first device 132, and queries each G&A to determine if an update is required. For example, the client 150 may initiate the launcher associated with a particular G&A and monitor the activity of the launcher to detect an update. In other embodiments, client 150 may communicate with a publisher 140 to determine whether an update is required. In each case, the client 150 conducts a query to assess whether an update is required for the particular G&A. In yet another embodiment, the controller 110 may facilitate communications with publishers to determine whether a particular G&A requires an update. In some embodiments, the process of querying for updates may be conducted sequentially each G&A in a profile. If, for a first G&A, it is determined that there is no update (NO) at step 405, then the process may loop back to the detection of the idle state and a second, G&A is queried at step 404. It is to be understood that this loop may be continuous and may repeat as desired for each G&A within a profile. Furthermore, after checking each G&A within a profile, the process may repeat to check each G&A again as desired.

In yet other embodiments, each G&A of a profile may be queried without looping back to check the idle state each time. In yet still other embodiments, at step 404, more than one G&A may be queried simultaneously to determine whether an update exists for the queried G&As.

If, for a first G&A, it is determined that a update exists (YES) at step 405, then at step 406, the client 150 communicates with the controller 110 an update message indicating that it has detected an update on the first device 132. Upon receiving the update message from the client 150 of the first device 132, the controller 110 sends a disable message to all devices 130 of the population having the update pending G&A within each's profile, to disable all instances of the update pending G&A.

After the update pending G&A has been disabled within the remaining population of devices 130 at step 406, controller 110 allows the update pending G&A on the first device 132 to download and install the update at step 408. The process 400 then proceeds in a similar manner to the process 300 as previously described. The client 150 of the first device 132 creates the update manifest 138 that can be used to propagate the update to other devices 134 of the population.

The process 400 then continues to confirm the successful installation of the update at step 409, enable the application at step 414 and distribute the update manifest at step 416 in the same manner as described above for the corresponding steps of process 300 in FIG. 3. Upon completion of local updates, each device 130 of the population sends a message to the controller 110 that the G&A has been updated successfully on the device. The controller 110 records the application update activity for each device 130 and enables the updated G&A allowing it to be used on the device.

Figure 5:
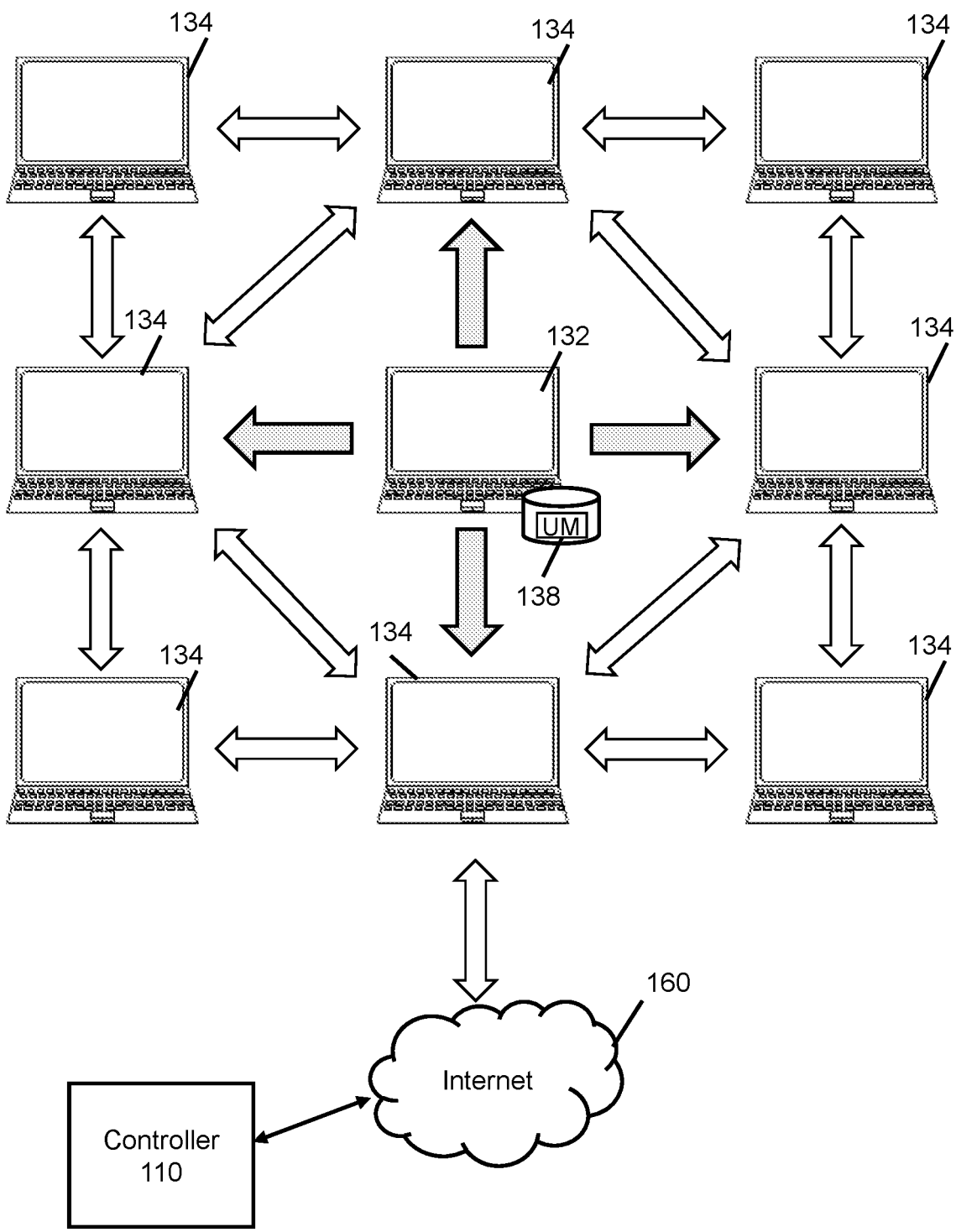
FIG. 5 is a diagram of a peer-to-peer exchange of an update among peer devices according to the present disclosure.

Referring now to FIG. 5, an exemplary distribution of an update manifest among devices is described. In some embodiments, the update manifest is distributed among the devices through a peer-to-peer exchange. In competitive electronic game centers, the performance of both individual devices and the network connectivity are important to ensure a reliable and equitable experience for all users. Due to the increasing number of games supported by game centers, it may be increasingly common for certain devices to be engaged in competition while other devices are updating other games. As a result, centers have a continuing need to reduce network congestion and the impact on devices caused by updates and other administrative activities so as not interfere with the user experience.

In one embodiment, the first device 132, after updating as described above with respect to process 300 or process 400, sends a message to the controller 110 indicating that the update manifest is ready for peer-to-peer (P2P) exchange with the population of devices 130. The controller responds by sending a message to the population of devices, indicating that an update is ready. Upon receiving the update message from the controller 110, the other devices 134 acquire the update manifest either directly or indirectly from the first device 132 through a peer-to-peer exchange. For example, in various embodiments, the controller 110 and/or individual devices or clients 150 may publish the update manifest that makes the update manifest available to the other devices. The other devices are then able to update the G&A locally by executing the instructions defined in the update manifest 138. In this manner, the update is published and the other devices 134 acquire the update manifest over the local network of the center rather than from the publisher 140. Rather than downloading the update from the publisher for every device of the population, the update is downloaded from the publisher only once for the first device. Thereafter, the update may be distributed among any number of devices within the population without burdening the external internet connectivity of the center.

In yet another embodiment, the peer-to-peer exchange is further enhanced such that upon receiving the update manifest, each of the other devices 134 makes the update manifest available through peer-to-peer exchange. As the number of devices within a population grows the burden of transmitting the update manifest to each of the other devices increases. In some embodiments, once a device has received the update manifest, that device is configured to make the update manifest available to other devices. For example, the first device may distribute the update manifest to a second device, which in turn could distribute the update manifest to a third device, and so forth until the update manifest has reached the entire population.

Other methods of distributing the update manifest from the first device 132 to the other devices 134 are also contemplated. In some embodiments, the entire update manifest file 138 may be directly transferred from the first device 132 to each of the other peer devices 134. In some embodiments, the update manifest 138 may be uploaded by the first device 132 to a server, from which a peer device 134 is able to access the update manifest using File Transfer Protocol (FTP). In yet still other embodiments, the update manifest 138 may be transferred via single hop methods, for example, the first device 132 may transfer the update manifest 138 to a first peer device 132, and the first peer device, after receiving the update manifest transfers the update manifest file to a second peer device, and so forth.

By disturbing the update manifest using a peer-to-peer exchange as described above, the system 100 reduces the server and network impact of distributing large files. The system 100 mitigates the impact to each device and the network performance overall even as the population of devices. The system further improves performance by avoiding significant increase in internet traffic, maintaining speeds higher for all devices in general, regardless of whether or not they are directly involved in the peer-to-peer exchange.

As discussed above, the presently disclosed systems and methods for updating an application for a population of devices using a controller provide numerous technical effects and benefits. For example, the presently disclosed system provides the technical effect of automatically enforcing version control requirements while reducing burdens on the local internet connection. The disclosed systems and methods provide the further technical effect of providing a scalable infrastructure for distributing updates that mitigates the impact on the processing and communications resources of device of the population even as the population grows. In this manner, the disclosed systems and methods allow a gaming center to optimize its network and device resources to provide improved user experience for gaming competitions. For example, a fair playing field is created and maintained by controlling the versions of software implemented across a population of user devices.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

In the specification and claims, reference will be made to a number of terms that have the following meanings. The singular forms "a," "an" and "the" include plural references unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be." The term "instructions" as used herein refers to computer executable instructions.

While principles and modes of operation have been explained and illustrated with regard to particular embodiments, it must be understood, however, that this may be practiced otherwise than as specifically explained and illustrated without departing from its spirit or scope.

What is claimed is:

1. A method of updating an application for a population of devices using a centralized controller, the controller performing steps comprising:

receiving, at the controller, a first notice that an update is pending for an application from a first device of a population of devices;

instructing each device of the population of devices to disable the application;

permitting the update for the application to proceed on the first device, wherein the update is received by the first device from a publisher separate from the controller;

receiving, at the controller, a second notice that the update is complete for the application from the first device;

after receiving the second notice, instructing the first device to enable the application;

instructing the first device to publish the update for exchange with other devices of the population of devices, such that the other devices of the population acquire the update through a peer-to-peer exchange; and sending an instruction to re-enable the application for each device of the population of devices after receiving notification that the update is complete for said device.

2. A method of updating an application for a population of devices using a centralized controller, the controller performing steps comprising:

receiving, at the controller, a first notice that an update is pending for an application from a first device of a population of devices;

instructing each device of the population of devices to disable the application;

permitting the update for the application to proceed on the first device, wherein the update is received by the first device from a publisher separate from the controller;

publishing the update for exchange by the first device with the other devices of the population of devices, such that the other devices of the population acquire the update through a peer-to-peer exchange; and sending an instruction to re-enable the application for each device of the population of devices after receiving notification that the update is complete for said device.

3. The method of claim 2, wherein the population of devices is a subset of devices associated with a game center.

4. The method of claim 2, wherein the population of devices is a subset of devices associated with an office center.

5. The method of claim 2, wherein each of the devices of the population has a profile accessible by the controller, wherein the profile includes an identification of applications used by the device.

6. The method of claim 5, wherein the population of devices includes those devices for which the profile associated with the device includes an identification of the application for which the update is pending.

7. The method of claim 2, wherein the step of instructing each device of the population of devices to disable the application further includes sending an instruction to each device that causes each device to disable the application from operating on the device.

8. The method of claim 2, wherein the step of permitting the update for the application to proceed on the first device further includes instructing the first device to communicate with the publisher of the application to receive the update from the publisher.

9. The method of claim 8, wherein upon receipt of the update from the publisher, the first device installs the update for the application.

10. The method of claim 5 further comprising:

after permitting the update for the application to proceed on the first device, updating the profile of the first device to reflect the update of the application.

11. The method of claim 2, wherein the controller and the devices are in separate locations.

12. The method of claim 2 further comprising: for each of the other devices, in response to receiving, at the controller, a notice that the update is complete for the application from such device, instructing such device to publish the update for the peer-to-peer exchange with the other devices.

13. The method of claim 12, further comprising: after receiving the notice that the update is complete for the application from such device, updating a profile of such device to reflect the update of the application.

14. The method of claim 1 wherein, the step of instructing the first device to enable the application further includes instructing the first device to publish an update manifest generated by the first device based on the results of the update applied to the application, wherein the update manifest comprises files and instructions for modifying the application to conform with the update.

15. The method of claim 14, wherein the update manifest is created by a comparison of a directory listing of the application prior to the update with the directory listing of the application after the update.

16. The method of claim 2, wherein the first notice is received by the controller following an update required notification received by the application in response to a user attempting to invoke the application on the first device.

17. The method of claim 2 further comprising: sending an instruction to the first device to cause the application to request an update from the publisher when the first device is in an idle state.

18. The method of claim 2, wherein the first notice is received by the controller after the first device contacted the publisher to update an application during an idle state of the first device.

19. A system for updating an application for a population of devices, the system comprising at least one memory to store instructions; at least one processor, communicatively coupled to the at least one memory that executes or facilitates execution of the instructions, the instructions comprising: the method of claim 1.

20. A method of updating an application for a population of devices using a client installed on each device in the population of device comprising:

a first client sending to a controller, a first notice that an update is pending for an application from a first device of a population of devices;

each of the clients disabling the application on one of the devices of the population associated with such client;

the first client permitting the update for the application to proceed on the first device, wherein the update is received by the first device from a publisher separate from the controller;

publishing the update by the first device for exchange with the other devices of the population of devices, such that the other devices of the population acquire the update through a peer-to-peer exchange; and each of the clients re-enabling the application for each device of the population of devices after receiving a notification that the update is complete for said device.

21. A system for updating an application for a population of devices, the system comprising at least one memory to store instructions; at least one processor, communicatively coupled to the at least one memory that executes or facilitates execution of the instructions, the instructions comprising: the method of claim 2.

22. A system for updating an application for a population of devices, the system comprising at least one memory to store instructions; at least one processor, communicatively coupled to the at least one memory that executes or facilitates execution of the instructions, the instructions comprising: the method of claim 20.

\* \* \* \* \*